United States Patent [19]

Janssen

[11] 4,022,302
[45] May 10, 1977

[54] DISC BRAKE PADS

[75] Inventor: Theodor Janssen, Duisburg, Germany

[73] Assignee: Abex Pagid Reibbelag GmbH, Essen, Germany

[22] Filed: May 29, 1975

[21] Appl. No.: 582,006

[30] Foreign Application Priority Data

June 5, 1974 Germany .......................... 2427040

[52] U.S. Cl. .............................. 188/73.1; 188/73.5; 192/30 V; 428/463; 428/522
[51] Int. Cl.² ........................................ F16D 65/04
[58] Field of Search ............ 188/73.5, 250 E, 73.1, 188/205 A, 1 B, 251 A; 192/30 V; 428/442, 463, 522; 29/195 E, 195 L, 195 P

[56] References Cited

UNITED STATES PATENTS

| 2,801,714 | 8/1957  | Dotto .................... 188/251 A X |
| 3,160,549 | 12/1964 | Caldwell et al. ............. 188/1 B X |
| 3,378,116 | 4/1968  | Hennig ..................... 188/1 B X |
| 3,817,356 | 6/1974  | Dahlquist .................. 188/1 B |
| 3,918,555 | 11/1975 | Rath ....................... 188/73.5 |

Primary Examiner—George E. A. Halvosa
Attorney, Agent, or Firm—David A. Greenlee; Thomas S. Baker, Jr.

[57] ABSTRACT

A disc brake pad support plate is coated with a thin (less than 0.1 mm) layer of latex, preferably nitrile latex, to reduce brake noise and eliminate brake squeal.

4 Claims, 1 Drawing Figure

U.S. Patent　　　May 10, 1977　　　4,022,302
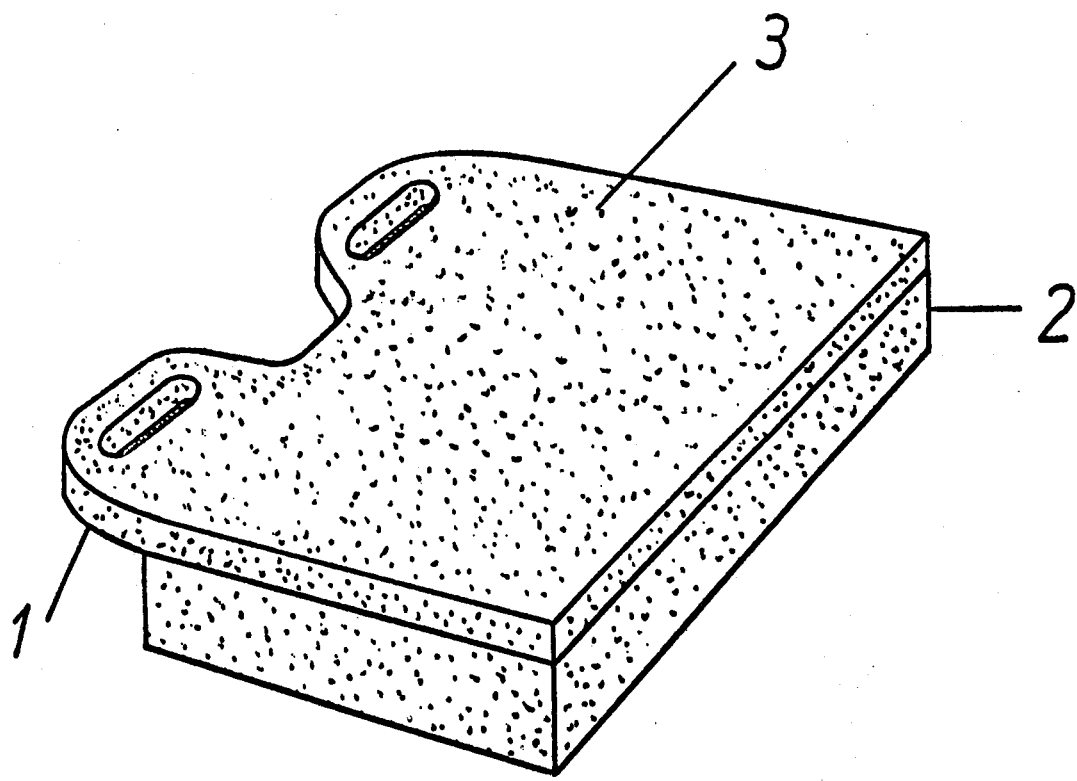

DISC BRAKE PADS

This invention relates to braking elements or pads for disc brakes, especially for motor vehicles.

Disc brake pads normally consist of a friction material element which is attached by pressing or bonding to the front face a support plate, usually a metallic plate, which gives the friction material the necessary support to resist a pressure load. This pressure load creates a compressive stress when the pad is pressed by the brake cylinder piston (acting on the back face of the support plate) against the brake disc during the braking operation. This produces not only high operating temperatures of the brake (e.g. 500° C) but also high specific area pressures (e.g. 1000 kg/cm$^2$), since the piston normally has a relatively small cross section. Often, in order to avoid irregular wear of the pad, the piston does not contact the pad support plate with its full face area, but only with a projecting rim on the face of the piston.

The friction between brake disc and pad causes vibrations during the braking operation which can be transferred from the pad via the piston to the brake cylinder and its mounting. These vibrations can produce loud braking noises, particularly "squeal", which are quite audible and quite objectionable.

Numerous solutions to this brake noise problem have been proposed. Some of these rely on the principle of damping vibrations by using a resiliant damping element, in the form of a thick rubber pad, so that the vibrations are not transferred to the support. According to this principle, a suitably thick layer of rubber, or equivalent rubber-like material, is applied between the brake shoe and friction material element in drum brakes, and between the support plate front face and the friction material element in disc brakes. Furthermore, it has been proposed to divide the disc brake support plate into two parallel metal plates and to interpose an intermediate layer of vibration absorbing material between them. These solutions have the disadvantages of increased production costs and weakened mechanical strength of the brake elements.

Another approach to solving this problem relies on the principle that two bodies with different masses have two different natural frequencies. By interconnecting both bodies, their vibration frequencies will interfere and disturb each other in such a manner that a vibration damping results if the masses of the bodies are suitably chosen. According to this principle, a suitably thick sheet of plastic, aluminum or other material is bonded to the back face of a steel disc pad support plate. This solution has the disadvantage of being expensive.

Other approaches to the brake noise problem are to fabricate the support plate of sintered material, e.g. sintered bronze or sintered iron. The sintered material either contains dispersed graphite or the voids in these spongy structures are filled with impregnated oil or dry lubricant, e.g. molybdenedisulfide. In such a structure friction vibrations in the support are reduced, while friction between the support plate and brake piston and between the support plate and the pad side guides is reduced so that resonance of the brake element vibrations with other parts of the brake is prevented. This method also is extremely expensive since it increases the production cost of brake elements enormously. Moreover, the necessary reduction of friction (to avoid the transfer of vibrations between the support plate and the brake piston and between the support plate and the side guides) depends on the performance of the above-mentioned lubricants. However, since disc brakes of cars are open and located relatively near the ground, they are constantly exposed to the intrusion of dust, dirt, and moisture and thus perform erratically.

This invention is directed to providing a disc brake pad which overcomes the disadvantages of the prior art proposals and contemplates the use of a single means to overcome the problem of friction vibrations and brake noise, thereby being superior to prior art pads in performances and being simple, as well as inexpensive.

The frequency of vibration of a body depends on its mass. The vibration frequency of a body having a given mass, which vibrates at a high frequency in the audible range, can be altered by increasing of the mass sufficiently so that the body vibrates at a lower frequency in the inaudible range. This invention applies the knowledge that the friction vibrations of a friction element in the audible range can be changed, i.e. damped, to avoid or eliminate brake noise, especially squeal. This is done, without changing the mass of the brake pad, by increasing the friction between the support plate and brake piston to eliminate relative movement between the support plate and piston so that the pad and the piston no longer vibrate as two seperate bodies. The pad and the piston are linked together to act as single body whose increased mass vibrates at a reduced frequency in the inaudible frequency range. By doing this, the pad and the piston are prevented from reacting together like a violin bow and string, where one part rubs against the other so that the vibration of the first part excites or transfers a vibration to the other part.

According to this invention the back face of the support plate is provided with a thin coating of latex, preferably nitrile-latex, of a thickness below 0.1 mm and preferably in a range of 0.04 to 0.06 mm. It has been found that by utilizing the inventive latex coating, the above mentioned linking of the pad and the piston is possible.

The inventive latex coating provides the necessary high friction level. The latex coating is so thin that both surfaces in contact cannot move parallel to each other, so that the linking of the pad and the piston (the elimination of relative movement between the support plate and brake piston) is achieved. A pad of rubber or similar attenuating material of the necessary thickness would not work, since it would permit, because of its thickness and elasticity relative movements of the surfaces, both parallel to each other and counter to each other. The rubber pad would also be completely crushed and quickly destroyed. For this latter reason, none of the prior art proposals located such a rubber pad on the back face of the support plate which contacts the brake piston. The thin latex coating of this invention, because of its thinness, is not crushed by the brake piston even at high specific pressure loads and resultant compressive stress; because of the thinness of the coating, the pressure of the brake piston is absorbed by the support plate.

The invention will now be further described, with reference to the single drawing FIGUE which is a perspective view of a disc brake pad, according to the invention.

A support plate 1 is covered on its back face (piston contact face) 2 with a thin coating 3 of latex which will now be described. The following latex coating compositions have proved to be particularly advantageous.

EXAMPLE 1

A vulcanization compound is produced by mixing the following components in the indicated proportions:
- 40.0 g water
- 10.6 g S (vulcanizing agent)
- 7.1 g vulcanizing accelerator agent
- 14.2 ZnO (also vulcanizing accelerator agent)
- 9.6 g chalk (filler)
- 16.3 talcum (filler)
- 2.2 g pigment (for instance black).
- 100.0 g vulcanization compound These components are mixed into a very smooth paste which is stirred in a stirring device in the proportions of:
- 47 g vulcanization compound to
- 100 g latex, preferably nitrile-latex.

This produces a vulcanizable mixture which can be brushed or preferably sprayed onto the support plate. By adding suitable pigment, the mixture can be provided in any desired color. The use of water exclusively as a solvent eliminates any safety problems during fabrication of the mixture. To obtain good adhesion, the support plate surfaces to be coated are preferrably first sand-blasted. The sprayed coating is then dried and vulcanized under normal conditions.

EXAMPLE 2

A smooth paste is produced by mixture of
- 40.0 g water
- 1.9 g dispersion agent
- 2.5 g colloidal sulfur (as vulcanizing agent)
- 4.0 g ZnO active (as vulcanizing accelerator agent)
- 1.0 g of a vulcanizing ultra accelerator agent
- 1.0 4g of a further vulcanizing ultera accelerator agent
- 30.0 g kaolin hard (filler)
- 3.0 pigment
- 83.4 g paste This paste is mixed with latex in the following proportions:
- 83.4 g paste
- 222.5 g acrylnitrile latex.
- 305.9 g mixture This mixture is sprayed on the support plate as thin as necessary for a coating of the desired thickness (e.g. 0.04–0.06 mm), dried for about 15 minutes in air, and then vulcanized in an oven at 130° C for about 10 minutes. Preferrably, the coating is sprayed on the support plate of a finished brake pad, i.e. after the friction element has been bonded to the support plate and after the side guides of the pad have been finish ground.

It has also been found that spraying the latex coating 3 on the side guides of the support plate 1 is beneficial. By doing this the friction between the side guides and the pad side surfaces is increased so that a link between the pad and the body of the disc brake is achieved which further effects the inventive aim: to diminish the vibration frequency by enlarging the mass and to increase the friction between parts so that one part rubs against the other part to create vibrations in both parts to cause frequency interference to reduce brake noise.

I claim:

1. A disc brake pad comprising a support plate having friction material mounted on one face thereof, characterized in that a coating of latex to a thickness of less than .1mm is bonded by vulcanization to the other face of the support plate for direct engagement by an operating piston to increase friction between the support plate and the piston.

2. The disc brake pad of claim 1, further characterized in that the latex coating has a thickness in the range of 0.04 to 0.06 mm.

3. The disc brake pad of claim 1, further characterized in that the coating is nitrile latex.

4. A disc brake pad comprising a support plate having friction material mounted on one face thereof, characterized in that a coating of nitrile latex to a thickness in the range of 0.04 to 0.06 mm is bonded by vulcanization to the other face and sides of the support plate, said other coated face being directly engageable by an operating piston.

* * * * *